(12) United States Patent
Aslam et al.

(10) Patent No.: US 10,225,344 B2
(45) Date of Patent: Mar. 5, 2019

(54) HIGH-PERFORMANCE KEY-VALUE STORE USING A COHERENT ATTACHED BUS

(71) Applicant: International Business Machines Corporation, Armonk, NY (US)

(72) Inventors: Muhammad Sohaib Aslam, Ajax (CA); Tiia J. Salo, Cary, NC (US); Ao Wan, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 15/235,604

(22) Filed: Aug. 12, 2016

(65) Prior Publication Data

US 2018/0048711 A1 Feb. 15, 2018

(51) Int. Cl.
| | |
|---|---|
| *G06F 13/16* | (2006.01) |
| *H04L 29/08* | (2006.01) |
| *G06F 15/173* | (2006.01) |
| *G06F 12/0815* | (2016.01) |

(52) U.S. Cl.
CPC ...... *H04L 67/1097* (2013.01); *G06F 12/0815* (2013.01); *G06F 13/1668* (2013.01); *G06F 15/17331* (2013.01)

(58) Field of Classification Search
CPC .. G06F 9/544; G06F 12/0815–12/0837; G06F 15/17331; H04L 67/1097
See application file for complete search history.

(56) References Cited

U.S. PATENT DOCUMENTS

| | | | |
|---|---|---|---|
| 7,702,743 B1* | 4/2010 | Wong | G06F 12/0284 709/216 |
| 8,433,695 B2 | 4/2013 | Wu et al. | |
| 8,612,402 B1 | 12/2013 | Givargis | |
| 9,164,702 B1* | 10/2015 | Nesbit | G06F 3/067 |
| 9,448,901 B1* | 9/2016 | Aslam | G06F 11/2094 |
| 2011/0137861 A1* | 6/2011 | Burnett | G06F 17/30348 707/622 |
| 2014/0143364 A1 | 5/2014 | Guerin et al. | |
| 2014/0325011 A1 | 10/2014 | Guerin et al. | |
| 2014/0325012 A1* | 10/2014 | Guerin | G06F 15/17331 709/212 |

(Continued)

FOREIGN PATENT DOCUMENTS

JP 2015069461 A 4/2015

OTHER PUBLICATIONS

Jacob et al. "Virtual Memory: Issues of Implementation." Jun. 1998. IEEE. Computer. vol. 31. pp. 33-43.*

(Continued)

*Primary Examiner* — Nathan Sadler
(74) *Attorney, Agent, or Firm* — David B. Woycechowsky (57) ABSTRACT

An infrastructure for servicing remote direct memory access (RDMA) requests without the need to pin memory and/or register memory for access by only a single RDMA adapter. Rather, RDMA requests can be coherently serviced from memory accessible to multiple adapters, and that memory can be flexibly managed (such as by swapping it out of main memory or moving it around within main memory). This coherent servicing of RDMA requests is achieved through the use of a coherent attached bus connecting the RDMA adapters to main memory that owns the address space.

9 Claims, 4 Drawing Sheets

(56) References Cited

U.S. PATENT DOCUMENTS

| | | | |
|---|---|---|---|
| 2014/0359043 A1* | 12/2014 | Gao | G06F 15/167 709/212 |
| 2015/0177987 A1 | 6/2015 | Lim et al. | |
| 2015/0242324 A1* | 8/2015 | Novakovic | G06F 12/0813 711/121 |
| 2015/0269116 A1* | 9/2015 | Raikin | B01D 53/9418 709/212 |

OTHER PUBLICATIONS

Novakovic et al. "Scale-Out NUMA." Mar. 2014. ACM. ASPLOS '14.*

Lim et al. "MICA: A Holistic Approach to Fast In-Memory Key-Value Storage." Apr. 2014. USENIX. NSDI '14.*

Besta et al. "Active Access: A Mechanism for High-Performance Distributed Data-Centric Computations." Jun. 2015. ACM. ICS '15.*

Michaela Blott. "Key-Value Store Acceleration with OpenPower." Mar. 2015. OpenPower Summit 2015. https://openpowerfoundation.org/wp-content/uploads/2015/03/Blott-Michaela_OPFS2015_Xilinx_031615_v8_final.pdf.*

Lim et al., "SILT: A Memory-Efficient, High-Performance Key-Value Store", SOSP '11, Oct. 23-26, 2011, Cascais, Portugal, pp. 1-13.

Mitchell et al., "Using One-Sided RDMA Reads to Build a Fast, CPU-Efficient Key-Value Store", 2013 USENIX Annual Technical Conference (USENIX ATC '13), 12 pages.

Russell, Robert D., "Introduction to RDMA Programming", InterOperability Laboratory & Computer Science Department, University of New Hampshire, Durham, New Hampshire, USA, 76 pages, Copyright 2012 IOL.

Wile, Bruce, "Coherent Accelerator Processor Interface (CAPI) for POWER8 Systems", IBM, White Paper, Sep. 29, 2014, 13 pages.

"Nallatech Collaborates with OpenPOWER Foundation" Camarillo, Calif., Nov. 10, 2014, 5 pages.

* cited by examiner

HIGH-PERFORMANCE KEY-VALUE STORE USING A COHERENT ATTACHED BUS

BACKGROUND

The present invention relates generally to the field of key-value data stores, and also to high-performance remote data access.

A key-value (KV) store, or KV database, is a collection of data structured as an associative array (also known as a dictionary or hash) of key-value pairs. Each key typically appears only once, and, in contrast to traditional relational databases, there is not necessarily any particular structure imposed on the value portion of an entry, nor any consistency between the value portions of different KV pairs. For example, one KV pair might be "123: 'A quick brown fox'" while another might be "456: F016A5, 21, 2016-05-15". KV stores have existed for some time, but are finding increased use in technologies such as cloud computing, big data analytics, and real-time web applications that face ever-growing performance demands.

Remote direct memory access (RDMA), or remote memory access (RMA), is direct memory access between the memory of one computer in a network and the memory of another (remote) computer. Data is transferred to or from the remote memory largely or entirely without the involvement of the operating system and/or central processing unit(s) (CPU(s)) on either or both computers, freeing CPU cycles and the associated data transfer bandwidth for other tasks. Copying of data between layers of the network protocol stack is also typically eliminated (the so-called "zero-copy" characteristic). RDMA can support both two-sided (a "send" command on one node must match a "receive" command on the other) and one-sided (a "read" or "write" command on one node can perform an operation without a complementary command pairing on the remote node) operations. Known benefits of RDMA implementations include high throughput, low latency, low CPU utilization, and/or reduced bus contention.

A "service, as that term is used herein," is a self-contained unit of machine logic (for example, software) functionality (for example, retrieving an online utility bill) that may be discretely invoked. A service may include the performance of one, or more, operations. A service may be encapsulated behind an interface. If a service is deployed in a cloud (that is, behind a cloud interface with respect to the user of the service, then it is a "cloud service." Cloud services typically involve shared, remote processing resources and/or storage data resources are provided to users, but where the topology, architecture, hardware identity and hardware characteristics of the hardware providing the cloud services are not needed to be known, and not typically known, by the user of the cloud service. Cloud services can be used to enable ubiquitous, on-demand access to a shared pool of configurable computing resources (for example, networks, servers, storage, applications and services), which are rapidly provisioned and released with relatively little management effort. In this way, cloud services can provide user and enterprises with various capabilities to implement and maintain the hardware and software used to provide the cloud service in and/or among third-party data centers. Cloud services leverage sharing of resources to achieve coherence and economy of scale over a communication network, somewhat analogous to the way a utility power grid delivers electrical energy to a great multiplicity of consumers and from a variety of electrical energy sources over a network of physical power lines.

SUMMARY

According to an aspect of the present invention, there is a method for performing the following operations (not necessarily in the following order): (i) receiving, by a first RDMA (remote direct memory access) adapter, through a communications network and from a remote client, a request to access a key-value store in a shared memory; (ii) determining based at least in part upon the request, a first process address space in which the key-value store resides (in at least some embodiments the CAPI bus that will be handling this operation); and (iii) accessing, by the first RDMA adapter, the key-value store in the first process address space. The first process address space is owned by a coherent attached bus connecting the first RDMA adapter to the shared memory and the determination of the first process address space in which the key-value store resides is performed by the first RDMA adapter and/or the coherent attached bus.

In some method embodiments according to the present invention: (i) the access of the key-value store is performed in a direct manner; and (ii) the access of the key-value store is performed in a coherent manner.

Some method embodiments, according to the present invention include an operation asking, by a second RDMA adapter, for the first process address space through the coherent attached bus.

Some method embodiments, according to the present invention include the following operations: (i) determining, responsive to the request, that at least a portion of the first process address space is absent from real memory; and (ii) responsive to the determination of absence, moving the portion of the first process address space into real memory.

In some method embodiments according to the present invention, the direct and coherent access takes place by way of the coherent attached bus connecting the first RDMA adapter to the shared memory.

In some method embodiments according to the present invention, the determination of the first process address space includes performing a hash on at least a portion of the received request (at least in some embodiments the CAPI bus that will be handling this operation).

According to an aspect of the present invention, there is a computer program product comprising: (i) a storage device structured and/or programmed to store machine readable data and machine executable program instructions, and (ii) program instructions stored on the storage device, the program instructions include: (a) first program instructions programmed to receive, by a first RDMA (remote direct memory access) adapter, through a communications network and from a remote client, a request to access a key-value store in a shared memory, (b) second program instructions programmed to determine, based at least in part upon the request, a first process address space in which the key-value store resides, and (c) third program instructions programmed to access, by the first RDMA adapter, the key-value store in the first process address space. The first process address space is owned by a coherent attached bus connecting the first RDMA adapter to the shared memory and the determination of the first process address space in which the key-value store resides is performed by the first RDMA adapter and/or the coherent attached bus.

In some computer program product embodiments according to the present invention further program instructions are programmed to: (i) perform the access of the key-value store in a direct manner; and (ii) perform the access of the key-value store in a coherent manner.

In some computer program product embodiments according to the present invention include program instructions programmed to ask, by a second RDMA adapter, for the first process address space through the coherent attached bus.

In some computer program product embodiments according to the present invention includes: (i) fourth program instructions programmed to determine, responsive to the request, that at least a portion of the first process address space is absent from real memory; and (ii) fifth program instructions programmed to, responsive to the determination of absence, move the portion of the first process address space into real memory.

In some computer program product embodiments according to the present invention, the direct and coherent access takes place by way of the coherent attached bus connecting the first RDMA adapter to the shared memory.

In some computer program product embodiments according to the present invention, the second program instructions are further programmed to perform a hash on at least a portion of the received request.

According to an aspect of the present invention, there is a computer system comprising: (i) a set of remote direct address adapter(s) (RDMA) including a first RDMA adapter; (ii) a shared memory; (iii) a coherent attached bus connecting in data communication the first RDMA adapter to the shared memory; (iv) a set of processor(s); (v) a storage device structured and/or programmed to store machine readable data and machine executable program instructions executable by the set of processor(s); and (vi) program instructions stored on the storage device, the program instructions including: (a) first program instructions programmed to receive, by the first RDMA adapter, through a communications network and from a remote client, a request to access a key-value store in the shared memory, (b) second program instructions programmed to determine, based at least in part upon the request, a first process address space in which the key-value store resides, and (c) third program instructions programmed to access, by the first RDMA adapter, the key-value store in the first process address space. The first process address space is owned by the coherent attached bus connecting the first RDMA adapter to the shared memory, and the determination of the first process address space in which the key-value store resides is performed by the first RDMA adapter and/or the coherent attached bus.

In some computer system embodiments according to the present invention further program instructions are programmed to: (i) perform the access of the key-value store in a direct manner; and (ii) perform the access of the key-value store in a coherent manner.

Some computer system embodiments according to the present invention further include program instructions that are programmed to ask, by a second RDMA adapter, for the first process address space through the coherent attached bus.

Some computer system embodiments according to the present invention includes: (i) fourth program instructions programmed to determine, responsive to the request, that at least a portion of the first process address space is absent from real memory; and (ii) fifth program instructions programmed to, responsive to the determination of absence, move the portion of the first process address space into real memory.

In some computer system embodiments according to the present invention, the direct and coherent access takes place by way of the coherent attached bus connecting the first RDMA adapter to the shared memory.

In some computer system embodiments according to the present invention, the second program instructions are further programmed to perform a hash on at least a portion of the received request.

Some embodiments of the present invention may be directed to a method for use with a cloud machine logic set including a key value (KV) data store in a shared memory, the method comprising the following operations, not necessarily in the following order: (i) receiving, by a cloud service implemented by the cloud machine logic set, a user request to access the KV data store; (ii) responsive to receipt of the request, providing KV data store access, with the provision of access including the following: (a) receiving, by a first RDMA (remote direct memory access) adapter, the request, (b) determining, by the first RDMA adapter and/or the coherent attached bus, a first process address space in which the key-value store resides, with the first process address space being owned by a coherent attached bus connecting the first RDMA adapter to the shared memory, and (c) accessing, by the first RDMA adapter, the key-value store in the first process address space.

Some embodiments of the present invention may be directed to computer systems including machine logic (for example, software) for performing the method of the preceding paragraph. Some embodiments of the present invention may be directed to computer program products including machine logic (for example, software) for performing the method of the preceding paragraph.

A method for storing key value pairs in a plurality of key value (KV) stores using a coherent accelerator processor interface (CAPI) and an associated set of CAPI adapter(s), including a first CAPI adapter, the method including the following operations, not necessarily in the following order: (i) creating a user space process that defines a plurality of process address spaces; (ii) assigning the first CAPI adapter as owner of the user space process; (iii) receiving, by a first CAPI adapter, a request to access at least one KV store of the plurality of KV stores; and (iv) using direct access of the first CAPI adapter to the plurality of process address spaces to perform the requested access of the at least one KV data store.

Some embodiments of the present invention may be directed to computer systems including machine logic (for example, software) for performing the method of the preceding paragraph. Some embodiments of the present invention may be directed to computer program products including machine logic (for example, software) for performing the method of the preceding paragraph.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some embodiments of the present invention provide an infrastructure for servicing remote direct memory access (RDMA) requests without the need to pin memory and/or register memory for access by only a single RDMA adapter. Rather, RDMA requests can be coherently serviced from memory accessible to multiple adapters, and that memory can be flexibly managed (such as by swapping it out of main memory or moving it around within main memory). In some embodiments of the present invention, such coherent servicing of RDMA requests is achieved through the use of a coherent attached bus connecting the RDMA adapters to main memory.

The flowchart and block diagrams in the Figures illustrate the architecture, functionality, and operation of possible implementations of embodiments of the present invention. In this regard, each block in the flowchart or block diagrams may represent a module, segment, or portion of hardware or software that comprises one or more executable instructions for implementing the specified logical function(s). In some alternative implementations, the functions noted in the block may not occur in the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some potential problems with the technology described above in the Background section will now be discussed. Conventional KV stores tend to saturate the CPU before network bandwidth. While higher performance KV store systems can be obtained with one-sided RDMA, such approaches tend to suffer from the requirement to pin and register memory with the RDMA adapter(s) and the associated substantial overhead involved. "Pinning" a segment of memory means that the address of that segment is fixed to a particular place in real memory and is never swapped out. "Registering" means that the network adapter is provided with the real-to-virtual address mapping of the pinned memory so it can directly service requests from a user space process to access that memory segment. Pinning and registering make the involved address unpagable to the swap. Furthermore, because each adapter holds its own memory registration information that the other adapters cannot access, one-sided RDMA access bandwidth cannot be increased by adding more adapters. Add-on accelerators such as field-programmable gate arrays (FPGAs) could also be used to implement higher performance KV stores since accelerators tend to have both minimal host CPU engagement and high throughput, but they also tend to suffer from limited storage and an inability to scale across multiple accelerators.

Figure 1:
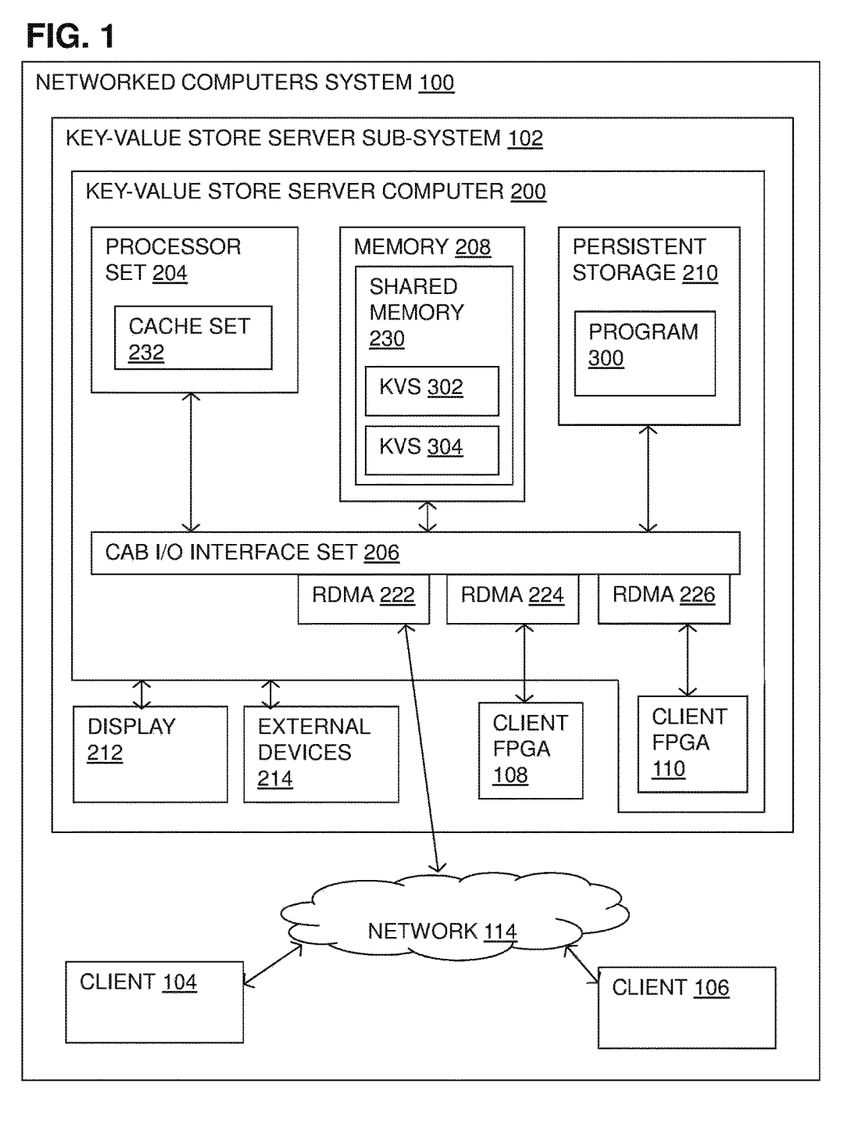
FIG. 1 is a block diagram view of a first embodiment of a system according to the present invention.

An embodiment of a possible hardware and software environment according to the present invention will now be described in detail with reference to FIGS. 1-4. FIG. 1 is a functional block diagram illustrating various portions of networked computers system 100, including: key-value (KV) store server sub-system 102; client sub-systems 104 and 106; client field-gate programmable array (FPGA) sub-systems 108 and 110; communication network 114; KV store server computer 200; processor set 204; coherent attached bus (CAB) input/output (I/O) interface set 206; memory device 208, including shared memory 230; persistent storage device 210; display device 212; external device set 214; remote direct access memory (RDMA) adapters 222, 224, and 226; cache memory set 232; KV stores 302 and 304; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with client sub-systems, such as via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores program 300 (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Coherent attached bus (CAB) I/O interface set 206 allows for input and output of data with other systems or devices that may be connected locally or remotely in data communication with server computer 200. For example, CAB I/O interface set 206 provides a connection to network 114 via one or more network interface cards. Any software modules discussed herein may be downloaded to a persistent storage device (such as persistent storage device 210) through an I/O interface set (such as CAB I/O interface set 206). The CAB portion of CAB I/O interface set 206 will be discussed in further detail below, in connection with RDMA adapters 222, 224, and 226, but CAB features are not necessarily used for all I/O operations.

External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

CAB I/O interface set 206 provides memory coherency and virtual memory support features for attached devices, allowing client systems and devices (such as clients 104, 106, 108, and 110) to share portions of memory 208 with the processors/cores of processor set 204 as if those clients were coherent peers to those processors/cores. Memory coherence permits coordinated accesses by these multiple independent processing elements to shared memory locations (which locations may also be represented in one or more dedicated or shared caches). One or more of the following aspects may be addressed in a memory coherency scheme: (i) currency (there is not a more recent value for the data somewhere else); (ii) consistency (the same value is seen by every element accessing the data at a given time); (iii) synchronicity (if and when copies of the data are cascaded to other locations, such as to ensure a current value is not accidentally overwritten by an older value); (iv) address translation (for example, translating between real and virtual memory addresses); and (v) memory access timing (such as delaying access in response to a page fault until the faulting page is loaded into real memory). In the embodiment of FIG. 1, all of these features are provided largely by the hardware and firmware associated with CAB I/O interface set 206, though some support may be required from other system elements (for example, a system process running on processor set 204 that services page faults). Some embodiments of the present invention may lack some of these features, or they may be provided by other system elements (for example, largely in software).

Each CAB in CAB I/O interface set 206 (in this embodiment, there is only one CAB) may own or otherwise be associated with one or more user space processes, and as such can allocate/manipulate memory in that process context. This allows such memory to be shared and accessible by multiple adapters, such as RDMA adapters 222, 224, and 226, that interface with CAB I/O interface set 206, with memory coherence and virtual-to-physical conversion issues handled dynamically by CAB I/O interface set 206 at the time of servicing an access request. Alternatively, each RDMA adapter may own, or be associated with a process that owns, the shared memory, with other adapters able to access that memory via shared CAB I/O interface set 206.

RDMA adapters 222, 224, and 226 provide remote direct memory access to portions of shared memory 230 for attached clients 104, 106, 108, and 110. In particular, RDMA adapters 222, 224, and 226 provide RDMA access for their attached clients to key-value stores 302 and 304 located in shared memory 230 of key-value store server computer 200. RDMA adapters 222, 224, and 226 are able to provide this shared access by virtue of acting through CAB I/O interface set 206, which allows each attached client to be serviced as a coherent peer to the processing elements of processor set 204, as described above. There is no need to pin the portions of shared memory 230 occupied by KV stores 302 and 304 and register them to a particular RDMA adapter, which would restrict memory management flexibility and limit access to the registered portions. Instead, any of remote clients 104, 106, 108, and 110 can access either of KV stores 302 and 304, and can do so without impeding memory management of server computer 200. In this embodiment, the RDMA adapters are all physical adapters, but in other embodiments some or all of the adapters may be virtual adapters ultimately running on underlying physical hardware. With respect to technical modifications that may, in some embodiments be required to be made to conventional CAPI and/or RDMA systems to implement the inventive methods discussed herein, some software level modification may be required for OS level implementation of RDMA in order to provide RDMA software ability to access shared memory. That could include providing each RDMA adapter with common "access key" or other techniques to verify access for all RDMA adapters on the system. Another possible modification would a modification of the manner in which the RDMA software interacts with the CAPI interface.

Clients 104, 106, 108, and 110 are unique in their physical connections to server computer 200. Client 110 is a field-programmable gate array (FPGA) system located inside the chassis of computer 200 and connected via a Peripheral Component Interconnect Express (PCIe) expansion slot. Client 108 is another FPGA system nearby but external to server computer 200 and connected via a Universal Serial Bus (USB) connection. Client 106 is a peer server system on the same rack as server computer 200 and connected via an Ethernet connection. Client 104 is an end-user system currently located 78 miles away and connected via the Internet. Despite their different characteristics and connections, each of these client systems is 'remote' in the sense that: (i) connectivity can be through any technique (now known or to be developed in the future). Some currently known connectivity techniques that may be suitable techniques include: Ethernet, Infiniband, FC (fibre channel), and/or WiFi based networking; and (ii) each provides support for RDMA and the CAB I/O interface of server computer 200.

Figure 2:
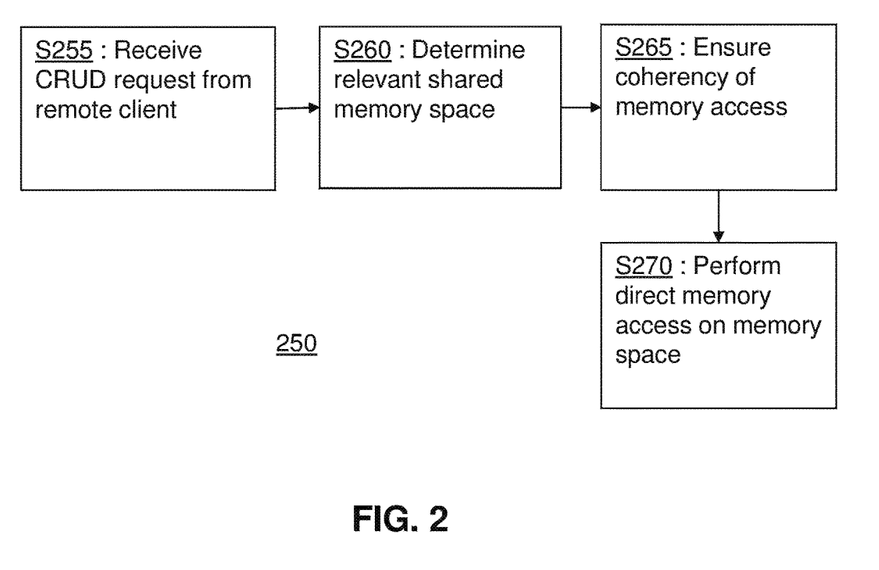
FIG. 2 is a flowchart showing a first embodiment method performed, at least in part, by the first embodiment system.

FIG. 2 shows flowchart 250, depicting a method according to the present invention, and will be used in conjunction with FIG. 1 to illustrate the functionality of system 100. Processing begins at operation S255, where one of RDMA adapters 222, 224, and 226 of KV store server computer 200 receives a create, read, update, delete (CRUD) request for one of KV stores 302 or 304. In this case, adapter 222 receives a read request from client 106 for an entry in KV store 304.

Processing proceeds to operation S260, where adapter 222 passes the request to the single CAB in CAB I/O interface set 206, which consults a lookup table to determine what process address space is associated with the request. Determining the process address space allows the system to reference the proper virtual memory context for performing the KV data lookup on KV store 304. In this case, the lookup table is entered by hashing the relevant portion of the CRUD request, as this method is quick and efficient. However, other methods known to those of skill in the art may be used. In embodiments with multiple CABs is CAB I/O interface set 206, the CRUD request (or relevant portion(s) thereof) may be forwarded to other CAB(s) in CAB I/O interface set 206, which would each determine if one of their own process address spaces were implicated and respond accordingly. Alternatively, in embodiments where RDMA adapters are the process owners, the adapters may communicate among themselves or with a centralized arbiter (such as CAB I/O interface set 206) to determine the relevant process address space.

Processing proceeds to operation S265, where CAB I/O interface set 206, using the address space context information determined above, mediates access to the shared memory by requesting adapter 222, such as by ensuring the virtual memory portions are available in real memory, performing the virtual-to-real memory address translation, and maintaining coherency (for example, ensuring the most current data has been moved from cache to main memory before performing the read access). While some of this functionality may involve processor set 204 (for example, to retrieve faulting virtual memory pages from a hard disk and assign them a place in real memory), much of it is handled by the hardware and firmware of CAB I/O interface set 206 itself. Because CAB I/O interface set 206 dynamically addresses coherency and address mapping issues, the KV store address spaces can be shared among adapters (no private registration) and need not be pinned in real memory. Thus requests to access any of the KV stores can come from any CAB-attached adapter.

Processing proceeds to operation S270, where the RDMA read access is performed. The coherency and virtual memory functions provided by CAB I/O interface set 206 permit any attached RDMA adapter to access this memory (though security functionality could be layered on to restrict access to only a subset thereof). The KV lookup is performed, and the value portion is returned to RDMA adapter 222 and, in turn, through network 114 to client 106, with minimal involvement of processor set 204 and minimal copying of the returned data (such as through various buffers in a conventional network protocol stack). Because the memory spaces are shared, access can be scaled by, for example, adding more adapters. At the same time, a client can access multiple memory spaces through a single adapter.

Some embodiments of the present invention recognize problems and limitations related to pinning and registering memory, such as decreased memory allocation flexibility, reduced shared memory space, limitations on scaling and parallel access, and overhead associated with the pinning and registration process. Further, some embodiments of the present invention recognize that in a multiprocessor/multi-core system, sharing memory between or among processors/cores requires some way of maintaining coherence between otherwise uncoordinated reads and writes from and to shared memory locations by the various processors/cores, often through one or more layers of memory cache.

Some embodiments of the present invention therefore employ a coherent attached bus (CAB), such as a Coherent Accelerator Processor Interface (CAPI) bus, that: (i) allows for implementing an optimized KV store without having to pin and register memory; (ii) enables main memory to be used for large data stores to CAB-attached accelerators; (iii) allows increasing access bandwidth by adding multiple accelerators that access the same memory because none of the accelerators needs to hold on to any private registration information; and/or (iv) allows multiple adapters to access the same shard of a KV store, such that the bandwidth can be increased nearly linearly by adding more adapters (reaching, for example, tens of millions of read operations per second as limited only by PCI bus throughput, versus the 12 million read operations against a shard by a single adapter in a more conventional implementation).

Some embodiments of the present invention allow multiple clients to use a KV store on a remote system with minimal engagement of the remote system's CPU(s). The remote system may in some cases be distributed over many systems to form a cluster. For simplicity of presentation in the following example embodiment, only a single remote system is considered.

Figure 3:
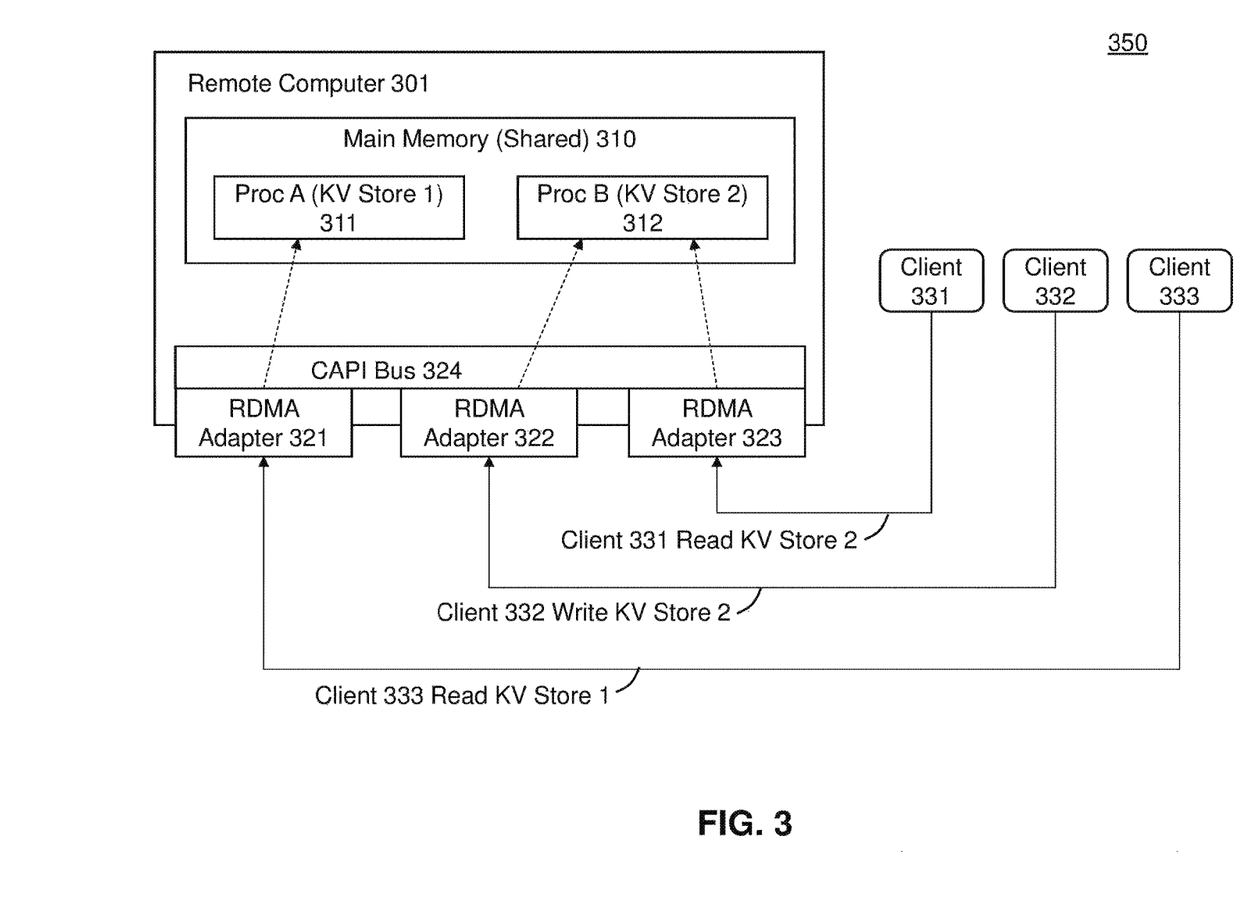
FIG. 3 is a block diagram view of a second embodiment of a system according to the present invention.

Shown in FIG. 3 is system 350, an embodiment of the present invention. System 350 includes: remote computer 301; shared main memory 310; process space A (KV store 1) 311; process space B (KV store 2) 312; CAPI bus 324; CAPI-attached RDMA adapters 321, 322, and 323; and client computers 331, 332, and 333. Clients 331, 332, and 333 are users of the KV stores that reside on remote computer 301. The CAPI-attached RDMA adapters 321, 322, and 323 of remote computer system 301 CAPI bus 324 is able to create user space processes and allocate memory in those process contexts. As a couple of points of terminology: (i) "CAPI" herein refers to a CAPI bus (but not RDMA adapters connected, in data communication, with the CAPI bus; (ii) "CAPI adapter" collectively refers to the CAPI bus and the RDMA adapter(s) connected in data communication therewith. CAPI-attached RDMA adapters 321, 322, and 323 of remote computer 301 can access and manipulate such memory via the CAPI bus. Because the CAPI bus infrastructure handles memory coherence issues, there is no need to pin and register memory with the RDMA adapters. Instead, a many-to-many relationship between clients and KV stores can be created. That is, a given client/adapter can access multiple KV stores, and multiple clients/adapters can access a given KV store. CAPI is a convenient form of a CAB because it is commercially available.

The operation of system 350 will now be described. Client 331, 332, and 333 each send requests for create, read, update, or delete (CRUD) operations for KV entries on remote computer 301, where each request contains information about which KV store needs to be accessed. Each of CAPI-attached RDMA adapters 321, 322, and 323 read the associated requests (see FIG. 3), in this example for either KV store 1 or 2. CAPI bus 324 is the owner of the user space processes. It is also capable of direct allocation/manipulation of memory by using memory directives (for example, mmap). As this memory is shared, each process can read the memory of other processes. After initialization of each RDMA adapter, a host process of remote computer 301 manages (schedules) access to the shared memory for write operations. The write process follows a conventional RDMA send/post semantic.

When a request arrives at one of the RDMA adapters 321, 322, and 323, multiple CAPI-attached RDMA adapters perform the hash on the request to find out which process address space contains the KV data associated with the request. Any adapter can perform the hash as there is hash coherency (that is, the same process address space is visible to all adapters and a hash would allow the adapter to determine which process is holding the KV). The address space is shared and every adapter can access it. This design allows many adapter(s) to access same process address space. The data resides in main memory 310 of remote computer 301. Using CAPI-attached RDMA direct access to the process address space, the data is allocated/manipulated in accordance with each request. For example, a request from client 332 to write to KV store 2 may create a new entry in that KV store. Each process address space is contiguous virtual address space that the CAPI-attached devices are capable of accessing. This contrasts with conventional RDMA access, where KV stores 1 and 2 would each be allocated to dedicated sections of main memory, accessible to the RDMA adapter with which each is registered but inaccessible to peer RDMA adapters. Moreover, each section of virtual memory would be pinned to a specific location in physical memory, reducing the amount of physical memory available for paging or other virtual memory swap-outs and limiting memory management flexibility.

Figure 4:
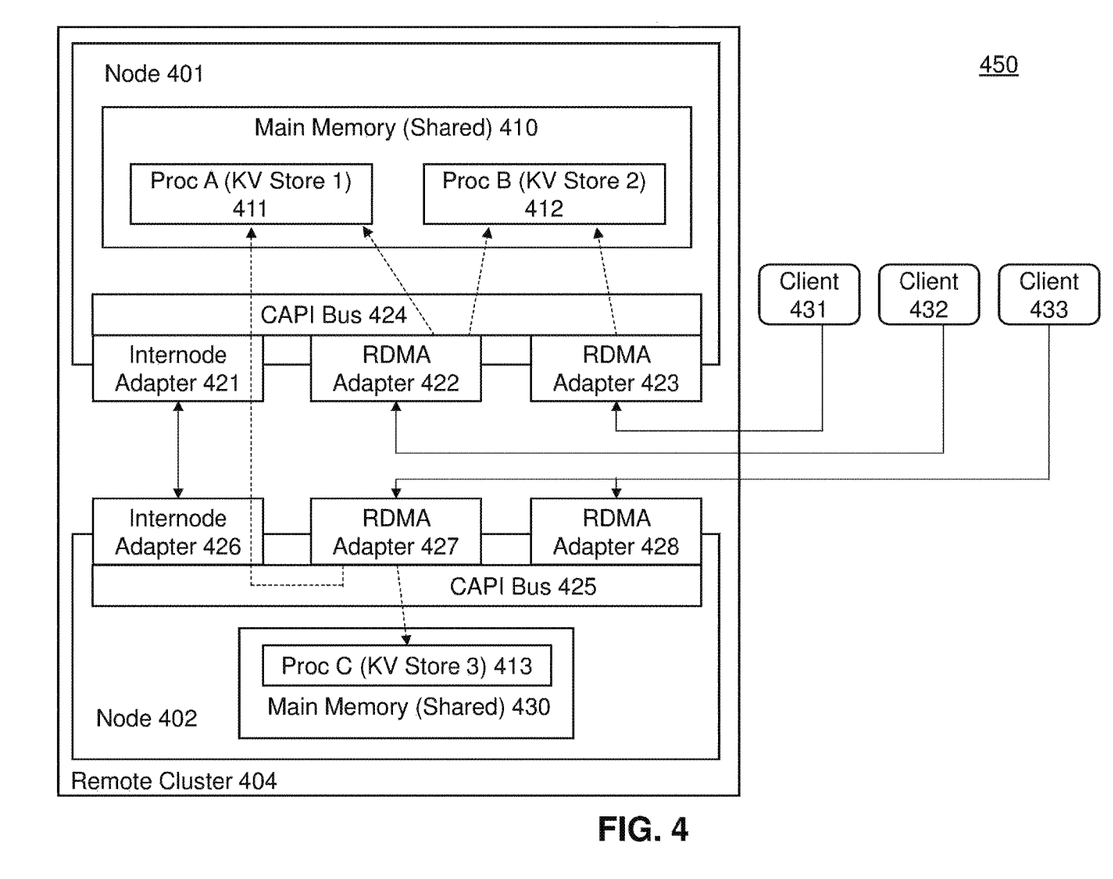
FIG. 4 is a block diagram view of a third embodiment of a system according to the present invention.

Shown in FIG. 4 is system 450, an embodiment of the present invention. System 450 includes: remote cluster 404; nodes 401 and 402; shared main memories 410 and 430; process space A (KV store 1) 411, process space B (KV store 2) 412, and process space C (KV store 3) 413; CAPI buses 424 and 425; internode adapters 421 and 426; RDMA adapters 422, 423, 427, and 428; and client computers 431, 432, and 433. Clients 431, 432, and 433 are users of the KV stores that reside on remote cluster 404. This embodiment is similar to the embodiment of FIG. 3 except that the remote computer is replaced by a remote cluster, with communications between the nodes of the cluster occurring via internode adapters. This provides for greater scaling capabilities, such as could be desirable in a cloud services environment. For simplicity of illustration, this cluster has only two nodes, but in general a cluster may have any number of nodes. Note that, as before, because one or more CAPI buses are used to resolve issues of memory coherency, there is no need to pin and register memory with specific RDMA adapters, allowing RDMA adapters to access any KV store owned by either of CAPI buses 424 or 425. Two possible advantages of this arrangement are specifically shown here: (i) multiple clients/adapters can access a given KV store—for example, client 431 is accessing both KV stores 1 and 2; and (ii) a single client/adapter can access multiple KV stores (or, perhaps more specifically, KV stores having different owners)—for example, client 433 is accessing both KV store 413, owned by CAPI bus 425, and KV store 411, which is owned by CAPI bus 424. For the second node (node-2) to access the memory on node-1, RDMA on node-2 should be able to see the memory space of the other node through CAPI on node-1 (and vice-versa). It is noted that this many not be appropriate for all embodiments of the present invention because the associated hash function will typically be complicated.

An embodiment of a method and system for providing KV access to a user as a cloud service will now be described in the following paragraphs.

The cloud service system includes three major components: the user device (for example, a smart phone type computing device), the cloud gateway, and the cloud machine logic set (that is the hardware and software of the various computing devices belong to, and utilized by, the cloud. In this embodiment, the cloud machine logic set has three logical components: application (for example, software for controlling access of the KV data store by the user device); platform (for example, VMs and/or hypervisors used to run the application component); and infrastructure (for example, processors and machine readable data storage mediums).

In a first operation of the method of this cloud service embodiment, a user requests access to the KV data store through the user device and a communication network (for example, the internet). This request is sent to, and received by, the cloud gateway. In one variation, the request is a read request designed to have delivered to the user device some KV data that has previously been stored in the KV data store. In another variation, the request is a write request designed to allow the user to add KV data to the KV data store.

In the second operation, the cloud gateway routes the user request to the cloud service application component for handling. The cloud gateway can do this because it dynamically has updated the physical and logical architecture and topology of the cloud that the cloud gateway services. For example, if the cloud service runs on a virtual machine (VM) in the cloud, this VM may change physical host computers over time, but the gateway will have data indicating where the proper VM is located at the time of the user device's access request.

In the third operation, the cloud machine logic set handles the access request. If the access request is not denied, then handling the request will involve read and/or write access to a KV data store. The cloud machine logic set includes the hardware and software described above in connection with the previously described embodiments of the present invention. For this reason, the KV data store access is potentially made more efficient. This potential efficiency is potentially compounded in cloud services embodiments because cloud computing allows for scalability, which can lead to very large scale systems in terms of the number of users serviced and/or the amount of data stored and/or delivered.

In the fourth operation, the cloud machine logic set delivers a response back to the user device either directly, or through the cloud gateway. For example, this response may include a confirmation that data was successfully written to the KV data store by the cloud service. As a further example, this response may include delivery of data from the KV data store to the user.

As mentioned above, some of the problems which may be solved by various embodiments of the present invention are as follows: (i) conventional KV stores tend to saturate the CPU before network bandwidth; (ii) higher performance KV store systems can be obtained with one-sided RDMA, such approaches tend to suffer from the requirement to pin and register memory with the RDMA adapter(s) and the associated substantial overhead involved; (iii) pinning and registering make the involved address unpagable to the swap; (iv) because each adapter holds its own memory registration information that the other adapters cannot access, one-sided RDMA access bandwidth cannot be increased by adding more adapters; and/or (v) add-on accelerators such as field-programmable gate arrays (FPGAs) type solutions tend to suffer from limited storage and an inability to scale across multiple accelerators. At least some embodiments of the present invention provide a solution to the above-mentioned problems because: (i) the determination of the first process address space in which the key-value store resides is performed by the first RDMA adapter and/or the coherent attached bus; (ii) the access of the key-value store is performed in a direct manner; (iii) the access of the key-value store is performed in a coherent manner; (iv) if the adapter is the owner it would not allow others to access, but because CAPI is the owner, the RDAM just asks for the address space through CAPI; and/or (v) an operation of asking, by a second RDMA adapter, for the first process address space through the coherent attached bus.

Some definitions for use in conjunction with this document follow in the following paragraphs.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for use with a key value (KV) store server computer including a set of remote direct access adapter(s), a coherent accelerator processor interface (CAPI) and a shared memory, the method comprising:
   storing, in the shared memory, a first KV data store including a plurality of KV data pairs that includes a first KV data pair;
   creating, by the CAPI, a first user space process corresponding to a first KV data store;
   allocating, by the CAPI, a first user process address space in the shared memory for the first user space process;
   receiving, by from a first user device, over a communication network and by a first remote direct memory access (RDMA) adapter of the CAPI, a user request to access the first KV data pair including the key for the first KV data pair;
   responsive to the receipt of the request, determining, by the CAPI, that the first KV data pair is stored in the first user process address space; and
   responsive to the determination that the first KV data pair is stored in the first user process address space, retrieving, by the first RDMA adapter, a first value corresponding to the key for the first KV data pair from the first user process address space in the shared memory; and
   sending, by the first RDMA adapter of the CAPI, over the communication network and to the first user, the first value.

2. The method of claim 1 further comprising
   storing, in the shared memory, a plurality of KV data stores; and
   for each given KV data store of the plurality of KV data stores:
   creating, by the CAPI, a respectively corresponding user space process for the given KV data store in the shared memory, and
   allocating, by the CAPI, a user process address space in the shared memory for the user space process corresponding to the given KV data store.

3. The method of claim 1 wherein:
   retrieving of the first KV data pair is performed in a direct manner; and
   the retrieving of the first KV data pair is performed in a coherent manner.

4. A computer program product (CPP) for use with a key value (KV) store server computer including a set of remote direct access adapter(s), a coherent accelerator processor interface (CAPI) and a shared memory, the method comprising:
   a non-transitory machine readable storage device; and
   computer code stored on the machine readable storage device, with the computer code including instructions for causing a processor(s) set to perform operations including the following:
   storing, in the shared memory, a first KV data store including a plurality of KV data pairs that includes a first KV data pair,
   creating, by the CAPI, a first user space process corresponding to a first KV data store,
   allocating, by the CAPI, a first user process address space in the shared memory for the first user space process,
   receiving, by from a first user device, over a communication network and by a first remote direct memory access (RDMA) adapter of the CAPI, a user request to access the first KV data pair including the key for the first KV data pair,
   responsive to the receipt of the request, determining, by the CAPI, that the first KV data pair is stored in the first user process address space,
   responsive to the determination that the first KV data pair is stored in the first user process address space, retrieving, by the first RDMA adapter, a first value corresponding to the key for the first KV data pair from the first user process address space in the shared memory, and
   sending, by the first RDMA adapter of the CAPI, over the communication network and to the first user, the first value.

5. The CPP of claim 4 wherein the computer code further includes instructions for causing the processor(s) set to perform the following operations:
   storing, in the shared memory, a plurality of KV data stores; and
   for each given KV data store of the plurality of KV data stores:
   creating, by the CAPI, a respectively corresponding user space process for the given KV data store in the shared memory, and allocating, by the CAPI, a user process address space in the shared memory for the user space process corresponding to the given KV data store.

6. The CPP of claim 4 wherein:
retrieving of the first KV data pair is performed in a direct manner; and
the retrieving of the first KV data pair is performed in a coherent manner.

7. A computer system (CS) for use with a key value (KV) store server computer including a set of remote direct access adapter(s), a coherent accelerator processor interface (CAPI) and a shared memory, the CS comprising:
a processor(s) set;
a machine readable storage device; and
computer code stored on the machine readable storage device, with the computer code including instructions for causing the processor(s) set to perform operations including the following:
storing, in the shared memory, a first KV data store including a plurality of KV data pairs that includes a first KV data pair,
creating, by the CAPI, a first user space process corresponding to a first KV data store,
allocating, by the CAPI, a first user process address space in the shared memory for the first user space process,
receiving, by from a first user device, over a communication network and by a first remote direct memory access (RDMA) adapter of the CAPI, a user request to access the first KV data pair including the key for the first KV data pair,
responsive to the receipt of the request, determining, by the CAPI, that the first KV data pair is stored in the first user process address space,
responsive to the determination that the first KV data pair is stored in the first user process address space, retrieving, by the first RDMA adapter, a first value corresponding to the key for the first KV data pair from the first user process address space in the shared memory, and
sending, by the first RDMA adapter of the CAPI, over the communication network and to the first user, the first value.

8. The CS of claim 7 wherein the computer code further includes instructions for causing the processor(s) set to perform the following operations:
storing, in the shared memory, a plurality of KV data stores; and
for each given KV data store of the plurality of KV data stores:
creating, by the CAPI, a respectively corresponding user space process for the given KV data store in the shared memory, and
allocating, by the CAPI, a user process address space in the shared memory for the user space process corresponding to the given KV data store.

9. The CS of claim 7 wherein:
retrieving of the first KV data pair is performed in a direct manner; and
the retrieving of the first KV data pair is performed in a coherent manner.

* * * * *